INVENTOR.
LOREN C. JONES
BY *Schmieding and Fultz*
ATTORNEYS

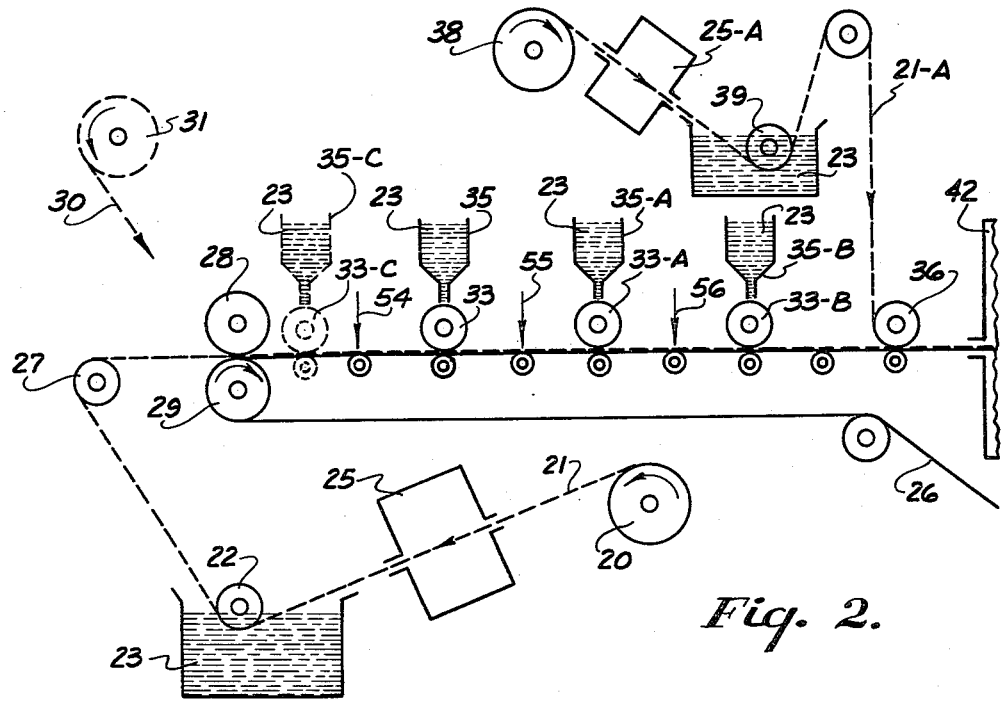
Fig. 2.
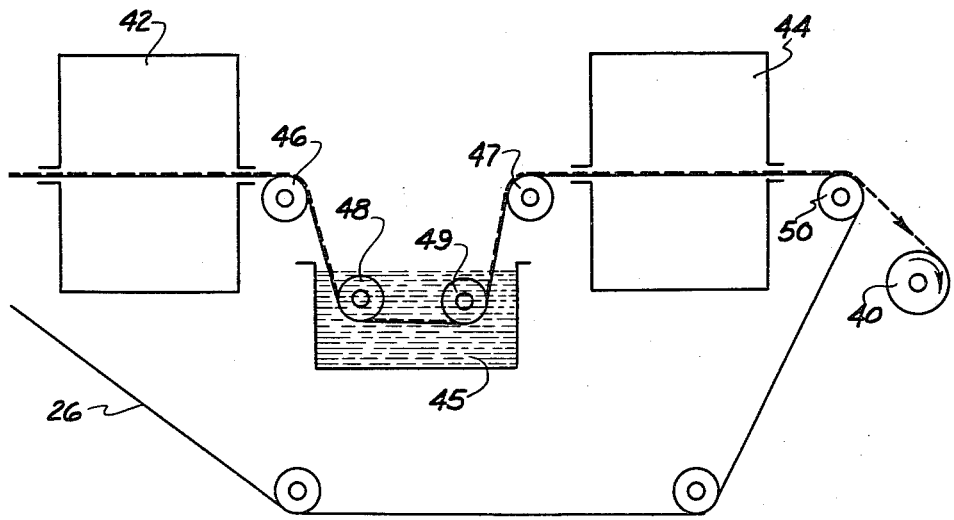
Fig. 2-A.
INVENTOR.
LOREN C. JONES
BY Schmieding and Fultz
ATTORNEYS Jan. 14, 1964     L. C. JONES     3,117,900
INSULATING ELECTRICAL CONDUCTORS
Filed May 20, 1960     5 Sheets-Sheet 3

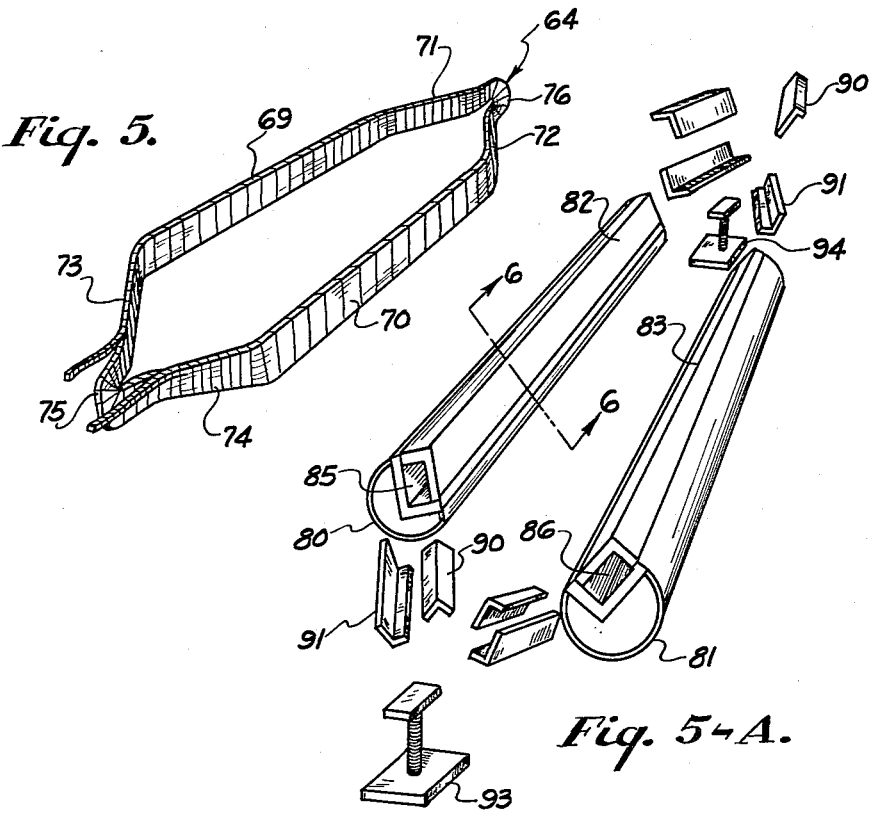
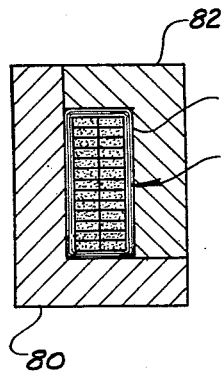

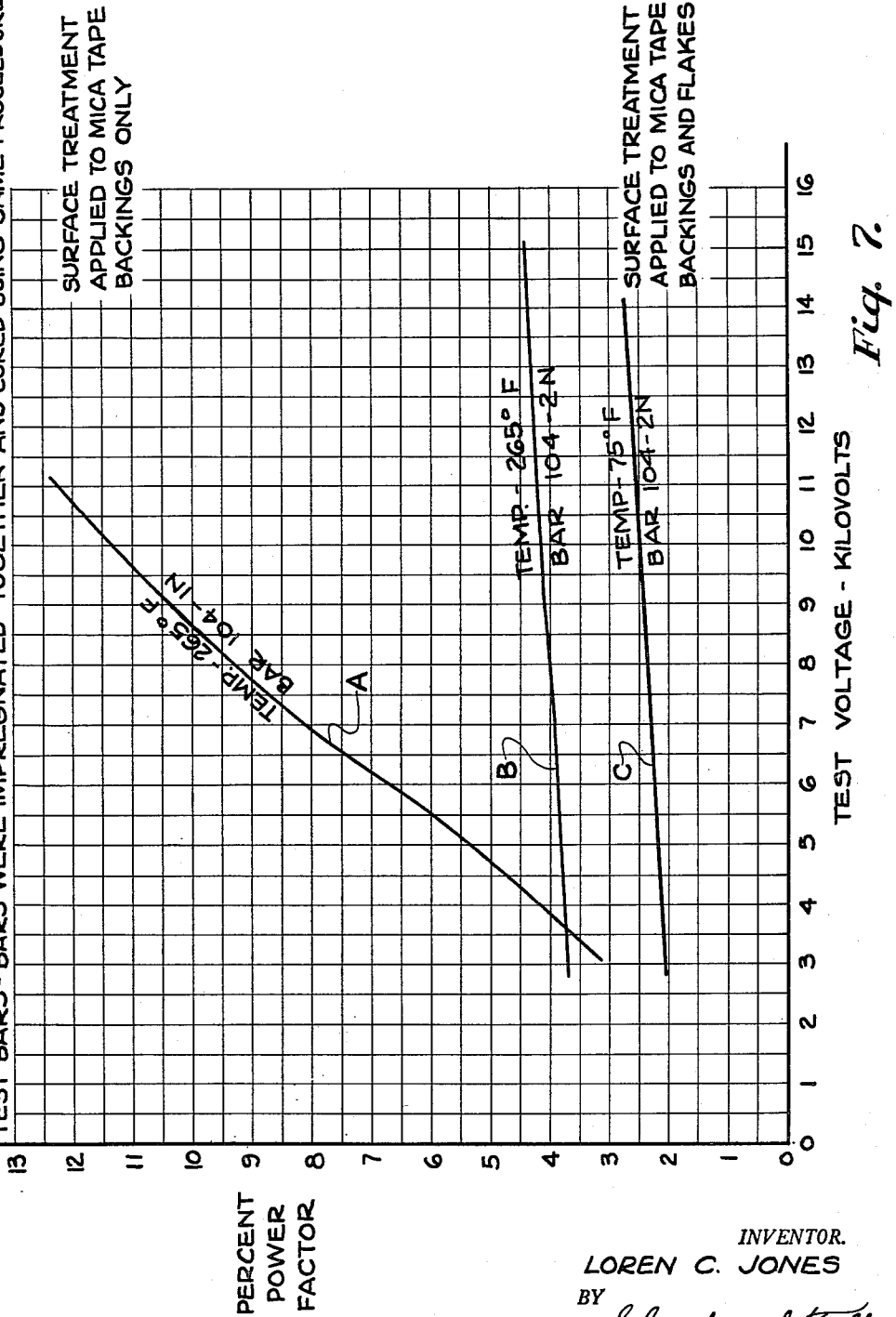

3,117,900
INSULATING ELECTRICAL CONDUCTORS
Loren C. Jones, Columbus, Ohio, assignor to McGraw-Edison Company, Elgin, Ill., a corporation of Delaware
Filed May 20, 1960, Ser. No. 32,503
10 Claims. (Cl. 156—53)

This invention relates to insulated electrical conductors and more particularly to conductors that are insulated by wrappings of mica material impregnated with synthetic resinous impregnants.

This application is a continuation-in-part of my co-pending application Serial No. 754,898, filed August 13, 1958, now abandoned, which is in turn a continuation-in-part of my application Serial No. 642,752, filed February 27, 1957, now abandoned.

In the production of electrical apparatus, such as high voltage generators and the like, it has been the practice in the art to insulate the conductors of coils for such apparatus with wrappings of mica tape, composed of backing material between which are sandwiched mica flakes or mica paper united with a resinous binder. The wrapped conductors are subjected to an impregnating cycle wherein an asphaltic compound or more recently a completely reactive liquid polymerizable composition is forced into the interstices of the mica tape.

It has been the practice in the art to utilize a high melting point asphaltic composition as the binder for the mica tape, and more recently, a resinous binder has been employed which may comprise liquid resinous polymers alone or polymers rendered liquid by the addition of plasticizers or solvents. In still other instances volatile adhesive mediums in the form of organic solvents have been used as binders for mica tape.

A difficulty is encountered when asphaltic compositions are employed as binders for mica tape in that such binders have been found to inhibit polymerization of subsequently applied impregnating resins so that such impregnating resins do not polymerize or cure adequately if used therewith.

Resinous binders present a problem in that they are never completely compatible with subsequently applied polymerizable impregnating resins, even in instances where the same composition is employed, with the resulting disadvantage that an interface exists between the impregnant and the binder in the interstices of the wrappings. Surface phases or interfaces between the binder and impregnant resins are undesirable since they result in nonuniform distribution of electrical stresses and mechanical weaknesses in the insulation. This lack of compatibility between similar or even identical polymerizable resinous binders and impregnants is believed to be due to changes that the compositions undergo during the lapse of time that is necessarily present between the application of the binder to the tape and the impregnation of the wrapped conductor.

Volatile adhesive mediums, in the form of organic solvents, have been found to be disadvantageous from the standpoint of producing a void-free bridge between a subsequently applied impregnant and the surfaces of the mica tape since such organic solvents are not always completely removable from the interstices of the mica tape and may leave deposits therein that are deleterious and prevent the achievement of a void-free bridge between the impregnant and all the surfaces of the mica tape. Moreover, such volatile organic solvents present a serious disadvantage in that they are a fire and explosive hazard, produce noxious fumes, and are also a frequent cause of dermatitis when employed under production conditions. It should be emphasized that when volatile organic solvents are used the components of the tape must be completely saturated if such solvents are to be effective as an adhesive medium. Hence the danger involved in using tapes of that type is readily apparent.

In general, the present invention completely eliminates the above mentioned difficulties by providing an improved mica tape insulation that is completely and efficiently impregnated with a suitable completely reactive liquid polymerizable composition so as to be void-free whereby superior electrical and structural properties are achieved.

It should be understood that tape material, as mentioned in the present specification, shall include relatively wide sheet material sometimes used to wrap the straight slot portion of a coil. Such sheet material is commonly referred to as cell wrapper material.

In fabricating the insulations of the present invention the use of a permanent binder for the mica tape is eliminated and, instead, a temporary or fugitive binder is applied to the mica tape during the fabrication thereof. According to the present invention it has been discovered that when water is utilized as a fugitive binder to maintain the mica material and backing material of the tape in assembled relationship during manufacture, the water can be removed from the tape and the tape stored indefinitely in a dry, binderless condition without deleterious effects. The tape is re-wetted when it is to be used, and after it is wrapped on a conductor the water is completely removed from the interstices of the mica material and backing material and the insulation subsequently impregnated with a completely reactive liquid polymerizable composition or other suitable impregnant.

It has also been discovered that an even more efficient binder for use in forming the tape can be formulated by a solution of a surface treating material in a volatile liquid compatible with the particular surface treating material. When such surface treating binders are employed, the highly volatile fugitive liquid portion of the solution can be removed from the interstices of the insulation, but the surface treating material will remain and form a film chemically bonded to the surfaces of the mica material and backing. Such film contains a reactive organic group that not only can combine with the subsequently applied completely reactive polymerizable impregnating composition but also improves the wetting ability of the impregnant. Hence when such surface treating fugitive binders are employed an extremely strong bonding bridge is obtained between the impregnating composition and the surfaces forming the interstices of the mica tape. Moreover, the interstices are completely filled with the impregnating composition whereby the insulation is free of voids which if present would be detrimental to the electrical and structural characteristics of the insulation.

It is therefore an object of the present invention to provide an improved insulated electrical conductor having a wrapped mica tape insulation the interstices of which are completely and efficiently impregnated with a polymerizable composition that forms a void-free bridge with the surfaces forming said interstices whereby superior electrical and structural properties are achieved.

It is another object of the present invention to provide an improved insulated electrical conductor having a wrapped mica tape insulation the interstices of which include a polymerized resinous impregnant and a surface treating material that is highly compatible with the impregnant.

It is still another object of the present invention to provide an improved process for fabricating an insulated electrical conductor which process is free of fire and explosive hazards, noxious fumes, and sources of dermatitis.

Further objects and advantages of the present invention will be apparent from the following description, reference being had to the accompanying drawings wherein preferred forms of embodiments of the invention are clearly shown.

In the drawing:

FIG. 1 is a diagrammatic view illustrating apparatus utilized in practicing a process of the present invention;

FIGS. 2 and 2-A are diagrammatic views illustrating another apparatus utilized in practicing another process of the present invention;

FIG. 5 is a perspective view of a typical coil to which the insulation of the present invention has been applied;

FIG. 5-A is an exploded perspective view of a jig used for holding the coil of FIG. 5 while the impregnant is being cured after the impregnating cycle;

FIG. 6 is a sectional view taken through the jig of FIG. 5-A and illustrating the manner in which the coil of FIG. 5 is pressed and held to proper dimensions in the jig. The section is taken along the line 6—6 of FIG. 5-A; and FIG. 7 is a graphical illustration showing the improved electrical characteristics achieved by the present invention.

Figure 1:
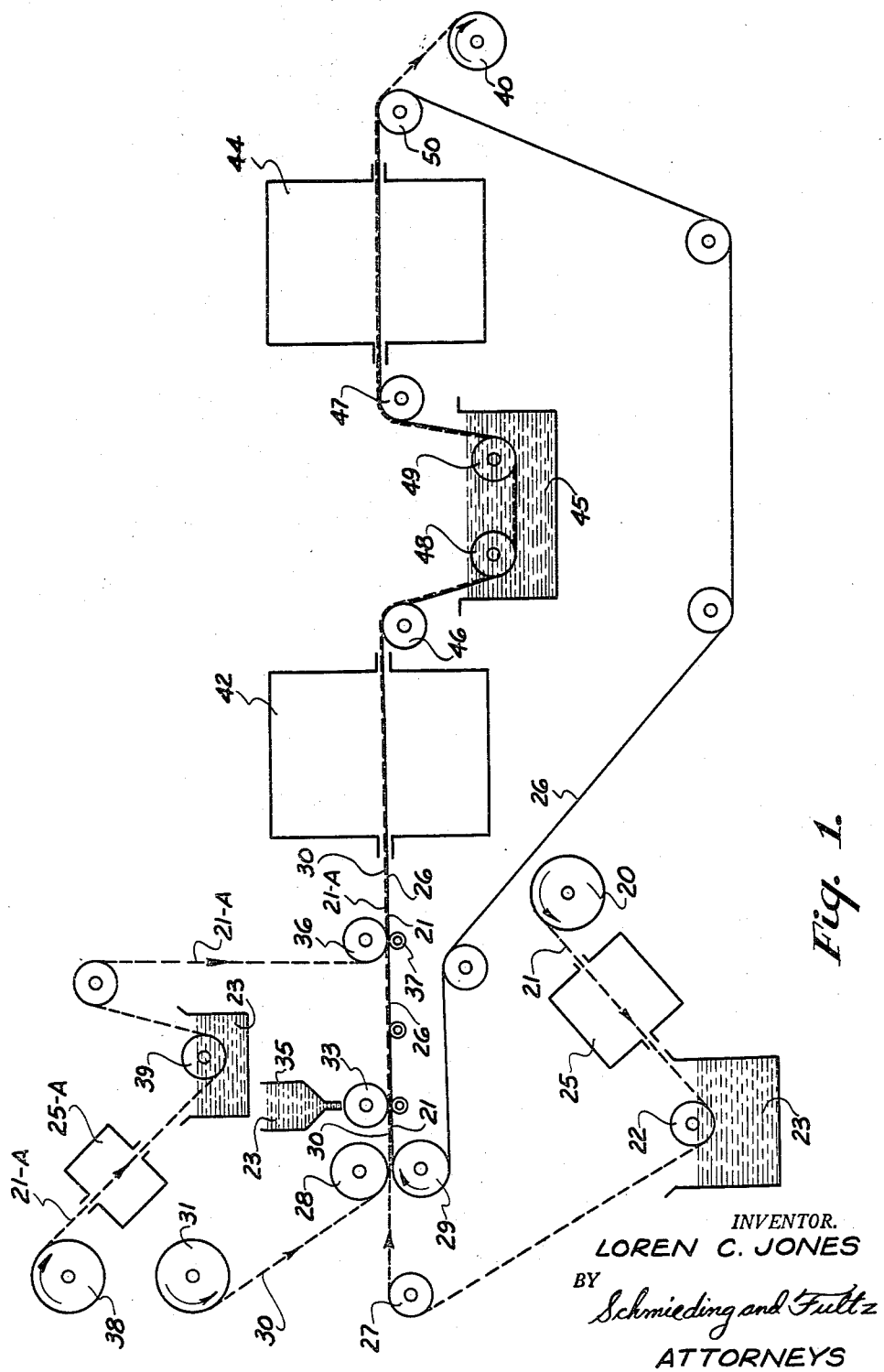

The apparatus of FIG. 1 includes a roll 20 which forms a source of supply for dispensing a strip 21 of backing material. The backing material 21 is preferably formed of woven cloth such as glass or cotton cloth but other suitable materials may be employed without departing from the spirit of the present invention. The strip 21 of backing material is passed under a roller 22 whereby the strip is immersed in a bath 23 wherein the strip is wetted. Bath 23 applies a fugitive binder to the strip and may consist of water, or a surface treating material in solution with water, or a surface treating material in solution with a suitable volatile liquid compatible with the particular surface treating material as will later be described in detail herein.

As an optional step in the process, prior to entering bath 23 the strip 21 of backing material may be passed through an oven 25 wherein the strip 21 is heated for the purpose of drying off moisture or burning off sizing material in the backing, or to accomplish both these purposes if required. This optional step is particularly desirable where certain surface treating materials are employed in the bath 23 as will later be described.

After leaving the bath 23, the strip 21 of backing material passes over the roll 27 and thence horizontally over flexible belt 26 and between rollers 28 and 29. At rollers 28 and 29 a strip 30 of mica paper, as from a roll 31 forming a source of supply thereof, is superimposed on the upper surface of strip 21 of backing material. The superimposed strips 30 and 21 next pass beneath a roller 33 which receives fugitive binder, of the same composition applied to strip 21, from a bath 23 in a container 35 and such roller applies the fugitive binder to the upper surface of the strip 30 of mica paper.

The two strips 30 and 21 next pass beneath a roller 36 and over a roller 37 at which point a second strip 21-A of backing material, either of the same or different type from which strip 21 is formed, is applied to the upper surface of the strip 30 of mica paper. The upper strip 21-A of backing material is supplied from a roll 38 which forms a source of supply thereof, and is thereafter passed under a roller 39 at which point the strip 21-A is immersed in a bath 23 of fugitive binder of the same composition applied to the strips 21 and 30. As an optional step for reasons previously described, prior to immersing strip 21-A in a temporary binder, the strip may be passed through an oven 25-A for the purpose of drying the backing material or for burning off sizing in the backing material, or for both purposes.

In instances where only water is employed in fugitive binder baths 23, without the addition of a surface treating material, and where the composite tape of backing material and mica material is to be wound up in a wetted condition, for immediate use to insulate electrical conductors or for storage in a non-drying environment, the composite tape is carried directly from rolls 36 and 37 to roller 40 without heating in the hot air circulating ovens 42 or without washing in the water bath 45.

In instances where a surface treating material is employed in fugitive binder baths 23, the composite tape leaving rollers 36 and 37 is passed through a hot air circulating oven 42 for the purpose of accelerating the drying off of the fugitive binder. This drying step is an important step in the application of some surface treating materials. For example, when methacrylato chromic chloride is utilized as a surface treating material for the components of the tape, the wetted materials should be dried in a hot air circulating oven 42 to set, i.e., to bond the molecules of the chromium complex to the tape materials. It is only necessary to dry off the composite tape materials and excessive heat should be avoided. For a typical glass fabric the temperature should not be in excess of 325 degrees Fahrenheit. After drying in hot air circulating oven 42, the backing material may be washed well, with continuously changing water, in order to remove any contaminants and the excess surface treating material, and for that purpose the composite tape may be next passed through a washing water bath 45. For this purpose, the strips 21, 21-A, and 30 are passed over rolls 46 and 47 and under rolls 48 and 49 with the latter rolls being submerged in an agitated water bath 45 whereby the composite tape is thoroughly washed.

In instances where the composite tape has been surface treated, and hence has been passed through hot air circulating oven 42 and washing water bath 45, and further, where it is desired to store the tape in a dry condition, the tape is dried by passing same through a second hot air circulating oven 44 and after which it is passed over roll 50 and wound up on storage roll 40 for dry storage.

In other instances where the composite tape has been surface treated, and hence passed through hot air circulating oven 42 and washing water bath 45, but where it is desired to immediately use the tape in a wetted condition, or to store tape in a non-drying environment, the second hot air circulating oven 44 is dispensed with and the tape is passed directly from washing water bath 45 to storage roll 40 for wet storage. It will be understood that oven 44 may be used to remove a portion of moisture from the composite mica tape for better handling.

Reference is next made to FIG. 2 which illustrates a second apparatus comprising an arrangement for practicing another process of the present invention wherein mica flakes are employed as the intermediate layer instead of the mica paper 30 of the process of FIG. 1.

The elements of the apparatus of FIG. 2 which correspond with identical elements of FIG. 1 are designated by like numerals. Here again strip 21 of backing material from source 20 is passed through binder bath 23 and thence over roller 27 and horizontally along the upper surface of flexible belt 26. After leaving rolls 28 and 29, however, mica flakes are applied to the top surface of strip 21 of backing material at a plurality of stations 54, 55, and 56. FIG. 2 shows three successive layers of mica flakes being applied, it being understood that the number of layers of mica flakes can be varied without departing from the spirit of the invention.

As seen in FIG. 2, a plurality of containers 35, 35-A, and 35-B, containing the binder bath 23, previously described, are each located beyond a respective mica flake applicating station 54, 55, and 56, for the purpose of applying fugitive binder to each of the successive layers of mica flakes as they are applied. It will be understood that the mica flakes can be applied at stations 54, 55, and 56 either by hand or by a suitable mechanical applicator for distributing the mica flakes evenly over the surface of strip 21 of backing material. After passing beyond the last applicator roller 33–B strip 21 of backing material, with layers of mica flakes applied thereto, pass beneath roller 36 at which time an upper strip 21–A of backing material is superimposed on the upper layer of mica flakes. After leaving roller 36 the composite tape may be subjected to any one of the three optional treatments, previously described in connection with the process of FIG. 1, depending on whether or not the tape is to be surface treated and whether it is to be stored wet or dry.

As a modification of the system of FIG. 2, a modified composite mica tape comprising both mica paper and one or more layers of mica flakes, disposed between upper and lower strips of backing material, can be produced by the incorporation of an additional storage roller, indicated by dotted delineation at 31, which serves as a source of supply for a strip of mica paper indicated by dotted delineation at 30. Such modified system further requires the incorporation of an additional applicator 35–C for applying a binder from bath 23 to a roller 33–C and thence to the mica paper 30. In such modification the strip 30 of mica paper is applied to the upper surface of strip 21 of backing material at rollers 28 and 29. The mica paper 30 is wetted at 33–C and then one or more layers of mica flakes are applied to the top of the strip of mica paper 30 at one or more of the stations 54, 55, and 56. The previously described binder bath 23 is applied to the mica flakes and mica paper from one or more of containers 35, 35–A, and 35–B. The upper strip 21–A of backing material is then superimposed on the layers of mica flakes and mica paper at roller 36, and any of the three optional treatments, previously described, may be employed in passing the composite tape from roller 36 to storage roll 40. It will be understood that the mica paper could be applied after one or more layers of mica flakes have been applied to strip 21, and then one or more layers of mica flakes applied over strip 21, the mica flakes, and the mica paper.

The baths 23 may be provided by either water alone as when the surface treating material is to be introduced as by subsequent vapor treatment, or by a surface treating material in solution with water, or by a surface treating material in solution with a volatile liquid compatible with the particular surface treating material. Such binder baths with or without surface treating material serve to maintain the components of the tape together during assembly and as they progress through the various stages of the process. It has been found greatly advantageous to apply a surface treating material to both the mica and backing material of the composite tape at the various binder baths 23. Such surface treating material serves its advantageous function by preparing the composite tape for more complete and efficient subsequent impregnation after the tape has been wrapped around an electrical conductor.

A surface treating bath, which also acts as a fugitive binder, may be prepared by diluting 100 parts of methacrylato chromic chloride with 4,680 parts of water. To this diluted solution is added, with good agitation, 222 parts of aqueous ammonia (1% $NH_3$), at such a rate that no permanent precipitation occurs. All parts are by weight. The pH of this solution, immediately after preparation, should be in the range of 5–6.5. As previously stated, the backing material may be first heat cleaned or dried by passing same through an oven 25 or 25–A and to complete the surface treatment of the mica material and backing material the composite tape should be dried in a hot air circulating oven 42 and washed in a washing water bath 45.

Another effective surface treating fugitive binder bath 23 may be provided by a solution of a vinyl silane and xylol. For example, vinyl chloro silane may be applied, in the liquid phase, from a solution in mineral spirits, carbon tetrachloride, or other organic solvents. For example, a 2.0% solution in xylol has been found to be satisfactory. After subjecting the components of the mica tape to a fugitive binder bath 23 of a vinyl silane and xylol, the composite tape leaving roller 36 should be dried at between 50 and 70 degrees centigrade in an oven 42 and the tape should then be washed in a water washing bath 45 and either subsequently dried in an oven 44 at between 50 and 70 degrees centigrade, or rolled up wet for storage.

As an alternative method of surface treating the mica and backing material when the fugitive binder baths 23 are water alone a vinyl silane can be applied in the vapor phase. Such vapor phase application involves the following steps: (1) Producing the vapor (boiling point 94 degrees centigrade) from a heated kettle. (2) Transferring the vapor to the treating chamber, the vapor must be kept at an elevated temperature to prevent condensation. (3) Sizing by bringing the vapor into contact with the material. Sufficient vapor must be available to insure thorough application. (4) Washing the material on emergence from the treating chamber. (5) Drying at 50 to 70 degrees centigrade or rolling up wet for storage.

When one of the above described surface treating materials is employed in fugitive binder baths 23, a film is chemically bonded onto the surfaces of the mica and backing material. This film contains a reactive organic group that not only can combine with the polymerizable liquid resinous composition subsequently applied to the mica tape during the impregnation cycle, but also enhances the wetting ability of the impregnant.

Figure 3:
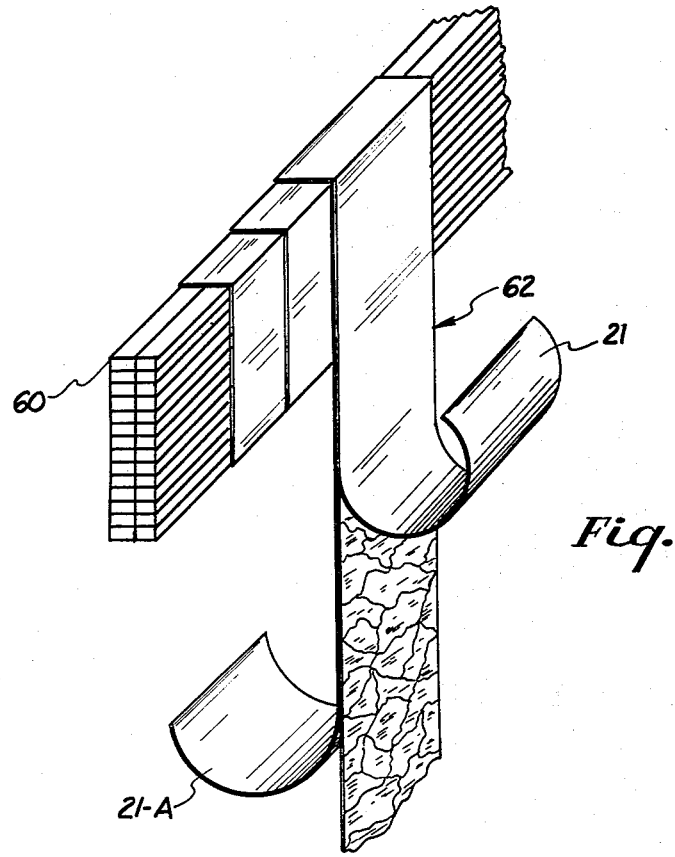
FIG. 3 is a perspective view of a typical composite electrical conductor showing the application of mica tape thereto.

Reference is next made to FIG. 3 which illustrates a typical composite mica tape, formed according to the present invention, being applied to a typical composite electrical conductor 60. The mica tape is indicated generally at 62 and consists of strips 21 and 21–A of backing material and an intermediate layer of mica material. Mica tape 62 is wrapped around electrical conductor 60 in a wetted condition with prior surface treatment.

Figure 4:
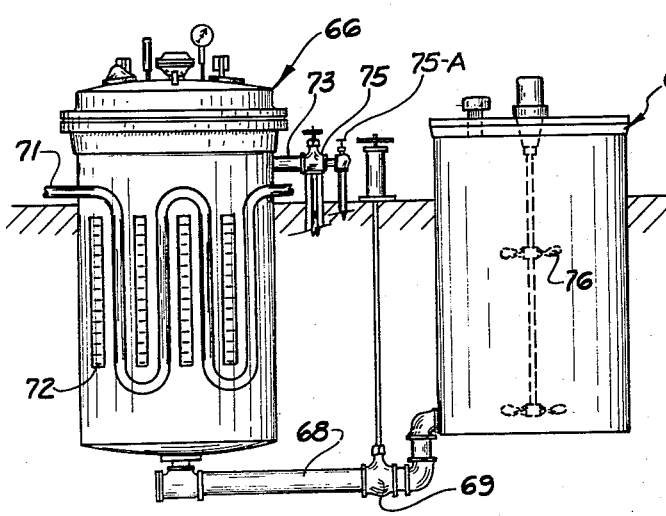
FIG. 4 is an elevational view of a vacuum and pressure impregnating system utilized in practicing the present invention.

After a composite conductor has been shaped and taped, as illustrated by the coil indicated generally at 64 in FIG. 5, the insulated coil 64 is baked in a hot circulating oven to remove the fugitive binder, air and other volatile materials while leaving the surface treating agent as a film covering the mica and backing materials, and then is suspended in a vacuum and pressure impregnating tank such as is indicated generally at 66 in FIG. 4. The apparatus of FIG. 4 further includes a refrigerated resin storage tank indicated generally at 67. A conduit 68 connects resin storage tank 67 with impregnating tank 66 and a valve 69 is provided for selectively isolating or connecting the tanks via conduit 68 when resin is to be transferred. The apparatus of FIG. 4 further includes a line 71 for conducting a refrigerant in heat exchange relationship with impregnating tank 66, and a plurality of electric heating elements 72 are also in heat exchange relationship with tank 66 for applying heat to the contents thereof. Line 73 communicates with the interior of tank 66 to place same in communication with suitable sources of vacuum or pressure, not illustrated. Valves 75 and 75–A are provided in line 73 for pressure or vacuum thereto and agitators 76 are disposed in resin storage tank 67 for the purpose of applying stirring to the resin.

A typical vacuum impregnating cycle using the apparatus of FIG. 4 to impregnate mica taped coils, such as coil 64 of FIG. 5, is as follows:

(1) Pre-bake the coils 12 hrs. at 250 deg. F. to remove air, the temporary binder and other volatile materials.

(2) Place heated coils in tank 66 and apply vacuum of one millimeter of mercury for 16 hrs. by exhausting air through line 73.

(3) The impregnant which is maintained at 55 deg. F. is transferred from tank 67 to tank 66 at a pressure slightly above the vapor pressure of the impregnant. Vacuum is maintained for one hour to degas impregnant.

(4) Vacuum is broken by admitting a dry inert gas, such as nitrogen, through line 73 until a pressure of 80 lbs./sq. inch is reached. Pressure is held for 4 hours.

(5) Pressure is slowly reduced, by releasing gas through line 73, to slightly above the atmospheric pressure and impregnant is forced back into storage tank 67. After excess resin has drained from coils, the coils are removed from tank 66.

After a coil 64 has been removed from tank 66 of FIG. 4, subsequent to the above described impregnating cycle, the coil is next placed in a jig, as illustrated in FIGS. 5-A and 6, during the curing of the impregnant. It is desirable to apply an outer wrapping of a material relatively impervious to the impregnant. A material known to the trade as Mylar (polyethylene terephthalate) is suitable for such outer wrapping. The purpose of the jig of FIG. 5-A is to hold the coil and insulation in the proper shape while the impregnant is being cured. As seen in FIG. 5, coil 64 includes slot portions 69 and 70 which are subsequently placed in slots when the coil is wound in an electrical rotating machine. Coil 64 further includes end turns 71, 72, 73, and 74 and coil knuckles 75 and 76.

The jig of FIG. 5-A includes base portions 80 and 81, provided with cover portions 82 and 83. When cover portions 82 and 83 are positioned on base portions 80 and 81 they define rectangular molds 85 and 86 for receiving slot portions 69 and 70 of coil 64. The jig of FIG. 5 further includes L-shaped blocks 90 and 91 which when assembled form molds for end turns 71, 72, 73, and 74 of the coil. The jig also includes a pair of support blocks 93 and 94 for supporting coil knuckles 75 and 76, respectively, during the curing process. Cover portions 82 and 83 are secured to base portions 80 and 81 and L-shaped blocks 90 and 91 are secured to coil ends 71, 72, 73, and 74 by suitable clamps, not illustrated. The coil is cured by passing steam through the jackets formed by base portions 80 and 81 while applying circulating current through the coil to affect curing of the end turns. Cooling of the cured coil may be accelerated by passing water through the steam jackets.

Completely reactive compositions suitable for use as impregnating compositions for the process may, for example, include any fluid polymerizable composition, ordinarily with a catalyst, that, upon being heated to a predetermined temperature, polymerizes into a thermosetting material. Specific examples of such compositions are disclosed and discussed in detail later herein.

Reference is next made to FIG. 7 which graphically illustrates, in a typical case, the outstanding improvement in electrical characteristics achieved when a surface treating material is utilized in the baths 23 of the processes of the present invention. Referring first to lines A and B, two identical electrical conductor bars 104-1N and 104-2N were prepared in an identical manner and impregnated together and cured using the same procedure. The tapes used for wrapping the conductors each consisted of two strips of glass fiber backing material and intermediate layers of mica flakes. The impregnant used was a typical polymerizable resinous composition. The only difference in treatment was that in the case of bar 101-1N the surface treatment was applied only to the glass fiber backing material, whereas in the case of bar 104-2N the surface treatment was applied to both the backing material and the mica flakes, according to the present invention, whereby all the surfaces of the wrapped insulation were surface treated. In both instances the surface treating solution employed consisted of the solution of methacrylato chromic chloride prepared and applied as previously described herein. As is represented by line A of the graph, FIG. 7, bar 104-1N displayed a sharp rise in percent power factor with increases in the test voltage applied whereas bar 104-2N displayed only a negligible rise in percent power factor with increases in the test voltage applied as is represented by line B in the graph of FIG. 7.

Referring next to lines B and C, a comparison of power factors at room and elevated temperatures is illustrated. It will be noted that the slopes of lines B and C are the same indicating that the interstices of the mica material and backing material are completely filled with the impregnant.

When impregnated wrapped insulations are utilized it is a well established fact that at voltage stresses above the internal ionization level the more voids present in the insulation the higher will be the percent power factor and the greater will be the rate of increase of percent power factor with increases in applied voltage. Hence it will be understood why the void-free insulation produced by the surface treated mica tape of the present invention provides the outstanding low percent power factor characteristics represented by line B of the graph of FIG. 7.

It should also be emphasized that the main problem encountered in impregnating wrapping materials, of the type disclosed herein, results from the inherently poor wetting characteristics of the previously described impregnants which normally prevent these impregnants from completely wetting the individual yarn filaments of the backing material and minute interstices of the mica material. In accordance with the present invention it has been found that this problem is effectively overcome by using a mica wrapping material free of permanent binder and having the surfaces covered with a film of a surface treating material.

For the purpose of the present application the term "surface treating material" means an intermediate coupling agent that chemically bonds first to the backing material and mica material and subsequently to the resinous impregnant. Hence in accordance with the present invention the surface treating material makes possible the formation of a void-free bond between the subsequently applied resin and the mica material and backing material.

With reference to the methacrylato chloride example discussed above the "surface treating material" action is accomplished by the coordination of methacrylic acid with chromium to form a highly reactive complex which, when applied to the surface of micaceous material, the chromium complex is strongly attached. The reactive organic group, which orients outwardly can subsequently combine with various polymerizable resins which are used as impregnants to fill the interstices between the mica and backing material.

It will therefore be understood that the "surface treating materials" used in the method of the present invention are materials which actually provide anchor points on micaceous material as well as anchor points on backing material to which a subsequently applied resinous impregnant will become chemically bonded. Hence the present invention provides a method for forming a tenacious bond between micaceous material, a resin impregnant, and a backing material.

For purposes of the present invention the term "surface treating materials" means compounds consisting of derivatives of silicate, amines, various organic derivatives of chromium, zirconium, aluminum, titanium, boron, and nickel which contain chemical functional groups capable of reacting not only with a suitable impregnating resin and the surfaces of glass cloth but also with surfaces of the micaceous material.

It should be pointed out that the particular surface treating material to be selected will depend on the type of impregnating resin with which it is to be used. Moreover, a particular surface treating material can be formulated from the previously mentioned compounds so as to include an organic group that chemically bonds with the particular impregnating resin to be used.

Examples of specific surface treating compositions that have been found suitable for practicing the present invention and the corresponding resin types with which each reacts are as follows:

| Surface Treating Material | Suitable Resinous Impregnants |
| --- | --- |
| Methacrylato chromic chloride | Polyester and epoxy resins and modifications and combinations thereof. |
| Vinyltrichlorosilane | Polyester and modified polyester resins. |
| Vinyltriethoxysilane | Polyester and modified polyester resins. |
| Amino-propyl triethoxy silane | Epoxy and modified epoxy resins. |

In general, if the impregnating resin contains a vinyl group, such as a polyester, then the surface treating material must contain a vinyl group which will react with the vinyl group in the impregnating resin. If, however, the organic impregnating resin contains polar groups such as epoxies, then the surface treating material must contain amine groups which will react with the polar groups of the impregnating resin.

It is believed that the bond between the surface treating material and the mica is due to the presence of hydroxyl groups on the surfaces of the mica which combine, through oxygen linkages, with the molecules of the surface treating material.

It is further believed that free hydroxyl groups, present in the various surface treating materials provide additional oxygen linkages that freely combine with the surfaces of the micaceous material which augments the strength of the bond.

It is further believed that where there is a deficiency in hydroxyl groups the higher molecular weight surface treating molecule is strongly held by electrostatic forces.

A typical impregnating resin for use with the wrapping material of the present invention may be an unsaturated polyester derived from the polycondensation products of dicarboxylic acids with dihydroxy alcohols when one or both of the materials is unsaturated. These compounds may be modified by monocarboxylic acids, monohydroxy alcohols, and even small amounts of polycarboxylic acids or polyhydroxy alcohols.

The polyester is subsequently dissolved in one or a combination of the following monomeric copolymerizable compounds:

Styrene (vinylbenzene)
Divinylbenzene
Alphamethylstyrene
Diallyl phthalate
Methyl methacrylate
Triallyl cyanurate
Vinyltoluene Suitable catalysts for the polyester resin are as follows:

Benzoyl peroxide
Cumene hydroperoxide
Tertiary-butyl perbenzoate

Another typical impregnating resin for use with wrapping material of the present invention may be an epoxy synthesized by reacting epichlorohydrin and bisphenol A in presence of excess caustic.

Suitable diluents for an epoxy as exemplified by one or more of the following:

Allyl glycidyl ether
1,4-butanediol diglycidyl ether
Butyl glycidyl ether
Cresyl glycidyl ether
Glycidyl methacrylate monomer
Octylene oxide
Phenyl glycidyl ether
Styrene oxide
Cardolite NC-513 proprietary (3M) epoxidized cashew nut oil Suitable curing agents for the epoxy resin are as follows:

Diethylene triamine
Dimethylamino propylamine
Methylene dianiline
$BF_3$ monoethylamine
Hexahydrophthalic anhydride
Methylated maleic acid adduct of phthalic anhydride
Eutectic mixtures of aromatic amines such as 40 parts 4,4 methylene dianiline and 60 parts metaphenylene diamine
Combination of various curing agents such as 1 to 5 parts per hundred of resin of a boron trifluoride amine complex and less than a stoichiometric amount of an eutectic mixture of an aromatic amine preferably less than 20 parts per hundred of resin It will be understood that the foregoing resins may be further modified with suitable flexibilizers and plasticizers which are well known to those skilled in the art.

As another aspect of the present invention a coil is wrapped with a wrapping material containing any of the surface treating materials previously disclosed herein. The wrapped coil is next installed in the slot portions of the core of an electrical machine. The core and coil are next vacuum impregnated with a suitable resinous impregnant whereby the interstices of the backing and mica material are completely filled with the resinous impregnant. The coil is next heated to completely polymerize the resinous impregnant with the coil in situ in the electrical machine.

As a modification of the process just described not only the slot portions and end turns of the coil but also the leads are wrapped with the composite wrapping material containing one of the previously mentioned surface treating materials. After the coil is installed in the slots of the core of the machine certain of the leads are connected to leads of adjacent coils to complete the electrical connections for the circuit of the machine. The core, coil and leads are next vacuum impregnated with a polymerizable resinous composition and the assembly is then heated to cure the composition to a solid state.

As still another aspect of the present invention the coil is wrapped with a composite wrapping material containing any of the surface treating materials previously disclosed herein. The coil is next vacuum impregnated with a completely reactive polymerizable composition. The coil is next heated sufficiently to only partially cure the composition to a B stage state as disclosed in my co-pending application Serial No. 79,237, filed December 29, 1960.

Suitable completely reactive resins that can be partially cured to a flexible B stage state are the epoxy resins combined with a suitable B stage curing agent such as (a) Eutectic mixtures of aromatic amines such as 40 parts 4,4 methylene dianiline and 60 parts metaphenylene diamine
(b) Combination of various curing agents such as 1 to 5 parts per hundred of resin of a boron trifluoride amine complex and less than a stoichiometric amount of an eutectic mixture of an aromatic amine preferably less than 20 parts per hundred of resin The partially cured coil is next installed in the slots of a core of an electrical machine. Since the resinous composition has only been cured to the B stage and is hence quite flexible it can be readily flexed while being installed in the slot portions without damage to the insulation. The coil and core are next heated to completely cure the B stage resin to a solid state.

While the forms of embodiments of the present invention as herein disclosed constitute preferred forms, it is to be understood that other forms might be adopted, all coming within the scope of the claims which follow.

I claim:
1. The steps in the method of insulating an electrical conductor which method comprises applying a thin layer of a reactive surface treating material to the surfaces of a composite wrapping having interstices and formed of fibrous glass backing material and mica material whereby said surface treating material chemically bonds to said surfaces, said surface treating material being selected from the group consisting of methacrylato chromic chloride, vinyltrichlorsilane, vinyltriethoxysilane, aminopropyl triethoxysilane; wrapping said electrical conductor with said composite wrapping; impregnating said composite wrapping with a polymerizable thermosetting resinous composition that wets all of said surfaces, chemically bonds to said surface treating material and completely fills all of said interstices in intimate bonded relationship with all of said surfaces of said backing material and mica material, said resinous composition being selected from the group consisting of unsaturated polyester resin, epoxy resin and combinations thereof; and polymerizing said resinous composition to a solid state to form a void-free monolithic structure.

2. The steps in the method of insulating an electrical conductor which method comprises applying a thin layer of methacrylato chromic chloride to the surfaces of a composite wrapping having interstices and formed of glass cloth backing material and mica material whereby said methacrylato chromic chloride chemically bonds to said surfaces; wrapping said electrical conductor with said composite wrapping; impregnating said composite wrapping with a polymerizable thermosetting resinous composition selected from the group consisting of unsaturated polyester resin, epoxy resin and combinations thereof that chemically bonds to said methacrylato chromic chloride and completely fills all of said interstices in intimate bonded relationship with all of said surfaces of said backing material and mica material; and polymerizing said resinous composition to a solid state to form a void-free monolithic structure.

3. The steps in the method of insulating and installing a coil for an electrical machine which coil includes a plurality of conductors, said method comprising applying a thin layer of a reactive surface treating material to the surfaces of a composite wrapping having interstices and formed of fibrous backing material and mica material free of resinous binder whereby said surface treating material chemically bonds to said surfaces of said mica material; said surface treating material being selected from the group consisting of methacrylato chromic chloride, vinyltrichlorosilane, vinyltriethoxysilane and amino propyl triethoxy silane; wrapping said plurality of conductors with said composite wrapping; installing said wrapped coil in said electrical machine; impregnating said coil with a polymerizable resinous composition that wets all of said surfaces, chemically bonds to said surface treating material and completely fills all of said interstices of said backing material and mica material, said resinous composition being selected from the group consisting of unsaturated polyester resin, epoxy resin and combinations thereof and polymerizing said resinous composition to a solid state to form a void-free monolithic structure.

4. The steps in the method of insulating and installing a coil for an electrical machine which coil includes a plurality of conductors, said method comprising applying a thin layer of a reactive surface treating material to the surfaces of a composite wrapping formed of fibrous backing material and mica material free of resinous binder whereby said surface treating material chemically bonds to said surfaces of said mica material; said surface treating material being selected from the group consisting of methacrylato chromic chloride, vinyltrichlorosilane, vinyltriethoxysilane and amino propyl triethoxy silane; wrapping said plurality of conductors with said composite wrapping; impregnating said coil with a completely reactive polymerizable thermosetting resinous composition selected from the group consisting of unsaturated polyester resin, epoxy resin and combinations thereof; partially curing said resinous composition to a B stage state; installing said wrapped coil in said electrical machine; and curing said resinous composition to a solid state after installation of said coil in said machine.

5. The steps in the method of insulating and installing a coil for an electrical machine which coil includes a plurality of conductors and leads, said method comprising applying a thin layer of a reactive surface treating material to the surfaces of a composite wrapping formed of fibrous backing material free of resinous binder and mica material whereby said surface treating material chemically bonds to said surfaces of said mica material; said surface treating material being selected from the group consisting of methacrylato chromic chloride, vinyltrichlorosilane, vinyltriethoxysilane and amino propyl triethoxy silane; wrapping said plurality of conductors and leads with said composite wrapping; installing said wrapped coil in said electrical machine; series connecting certain of said leads to form electrical connections for the circuit of said machine; wrapping said electrical connections with said composite wrapping; impregnating said electrical coil and electrical connections with a polymerizable resinous composition that chemically bonds to said surface treating material and completely fills all of said interstices in intimate bonded relationship with all of said surfaces of said backing material and mica material, said resinous composition being selected from the group consisting of unsaturated polyester resin, epoxy resin and combinations thereof; and polymerizing said resinous composition to a solid state.

6. The method of providing an electric coil with a bonded solid void-free insulation, which comprises wrapping the coil with a composite tape composed of a fibrous sheet backing material and a superimposed mica material all free of resinous binder, said tape containing a temporary volatile binder and a non-volatile surface treating material of which the temporary binder serves to hold the backing material and the mica material together during wrapping, removing the temporary binder while leaving a residue film of surface treating material completely covering the surfaces of the mica material in chemically bonded relation thereto, said surface treating material being selected from the group consisting of methacrylato chromic chloride, vinyltrichlorosilane, vinyltriethoxysilane and amino propyl triethoxy silane and being capable of reacting with polymerizable thermosetting resins selected from the group consisting of unsaturated polyester resin, epoxy resin and combinations thereof to bond said resins to the surfaces of said mica material, and impregnating said wrapped coil with said resins and thereupon curing the same into a solid state.

7. The method set forth in claim 6 including the step of heating said tape to set said surface treating material before the tape is wrapped on said coil.

8. The method set forth in claim 6 wherein said temporary volatile binder is water.

9. The method of producing a solid electrical insulation in bonded relation on an electrical coil, which comprises wrapping the coil with a composite pliable insulating tape composed of glass cloth backing material and superimposed mica material all free of resinous binder, said tape containing a volatile temporary adhesive medium for binding together said backing material and mica material during wrapping and containing a reactive surface treating material chemically bonded thereto and selected from the group consisting of methacrylato chromic chloride, vinyltrichlorosilane, vinyltriethoxysilane and amino propyl triethoxy silane, heating said wrapped coil to evaporate said temporary adhesive medium, said surface treating material being capable of reacting with unsaturated polyester and epoxy thermosetting resins to bond firmly said resins to the surfaces of said backing and mica materials, evacuating air and volatile material from said wrapped coil, applying to said evacuated coil a liquid polymerizable thermosetting resin selected from the group consisting of unsaturated polyester resins, epoxy resins and combinations thereof, said resins being applied under pressure to fill the pores and interstices in said composite wrapping, and heating said wrapped coil to polymerize said liquid resin into a solid body and to bond said wrapping onto said coil into a void-free monolithic structure.

10. The method of producing a solid electrical insulation in bonded relation to an electrical coil, which comprises preparing a composite pliable insulating tape composed of two layers of fibrous insulating material free of resinous binder and of an intermediate layer of mica material, at least said mica material containing a film of reactive surface treating material completely covering the surfaces thereof and selected from the group consisting of methacrylato chromic chloride, vinyltrichlorosilane, vinyltriethoxysilane and amino propyl triethoxy silane, said reactive surface treating film being capable of wetting the surfaces of the mica material and of reacting with unsaturated polyester and epoxy thermosetting resins to bond firmly said resins to the mica material, wrapping said composite tape onto said coil, evacuating air and volatile material from said wrapped coil, applying to said evacuated coil a liquid polymerizable thermosetting resin selected from the group consisting of unsaturated polyester resin, epoxy resin and combinations thereof, said resins being applied under pressure to fill the pores and interstices in said composite wrapping, and heating said wrapped coil to polymerize said liquid resin into a solid body and to bond said wrapping onto said coil to form a void-free monolithic strurcture.

References Cited in the file of this patent
UNITED STATES PATENTS

| | | |
|---|---|---|
| 2,479,357 | Hill et al. | Aug. 16, 1949 |
| 2,493,693 | Parkinson | Jan. 3, 1950 |
| 2,656,290 | Berberich et al. | Oct. 20, 1953 |
| 2,700,010 | Balz | Jan. 18, 1955 |
| 2,754,237 | Brooks | July 10, 1956 |
| 2,757,298 | Botts et al. | July 31, 1956 |
| 2,763,315 | Berberich et al. | Sept. 18, 1956 |
| 2,821,498 | Botts | Jan. 28, 1958 |
| 2,953,466 | Brown | Sept. 20, 1960 |